United States Patent [19]

Ravenhall et al.

[11] 4,047,840
[45] Sept. 13, 1977

[54] IMPACT ABSORBING BLADE MOUNTS FOR VARIABLE PITCH BLADES

[75] Inventors: Richard Ravenhall; Charles T. Salemme; Arthur P. Adamson, all of Cincinnati, Ohio

[73] Assignee: The United States of America as represented by the Administrator of the National Aeronautics and Space Administration, Washington, D.C.

[21] Appl. No.: 581,751

[22] Filed: May 29, 1975

[51] Int. Cl.² .......................... F04D 29/36; F01D 5/32
[52] U.S. Cl. .................................... 416/135; 416/141; 416/220 R; 416/248
[58] Field of Search ............... 416/248, 220, 131, 135, 416/141, 140, 138, 166, 160, 219, 221

[56] References Cited

U.S. PATENT DOCUMENTS

| 2,936,155 | 5/1960 | Howell et al. | 416/135 X |
| 2,997,274 | 8/1961 | Hanson | 416/135 |
| 3,487,879 | 1/1970 | McCarthy et al. | 416/220 X |
| 3,689,177 | 9/1972 | Klassen | 416/220 |
| 3,860,361 | 1/1975 | McMurtry et al. | 416/120 |
| 3,870,434 | 3/1975 | Paulson | 416/160 |
| 3,900,274 | 8/1975 | Johnston et al. | 416/155 |

FOREIGN PATENT DOCUMENTS

| 483,633 | 5/1952 | Canada | 416/135 |
| 1,283,852 | 11/1968 | Germany | 416/207 |
| 740,757 | 11/1955 | United Kingdom | 416/219 |

*Primary Examiner*—Everette A. Powell, Jr.
*Attorney, Agent, or Firm*—Norman T. Musial; Derek P. Lawrence; Dana F. Bigelo

[57] ABSTRACT

A variable pitch blade and blade mount which is suitable for propellers, fans and the like and which has improved impact resistance. The invention is particularly directed to composite fan blades and blade mounting arrangements wherein the blades are permitted to pivot relative to a turbine hub about an axis generally parallel to the centerline of the engine upon impact of a large foreign object, such as a bird. By thus providing for the pivoting of the blades upon impact, centrifugal force recovery becomes the principal energy absorbing mechanism and a blade having improved impact strength is obtained.

21 Claims, 9 Drawing Figures

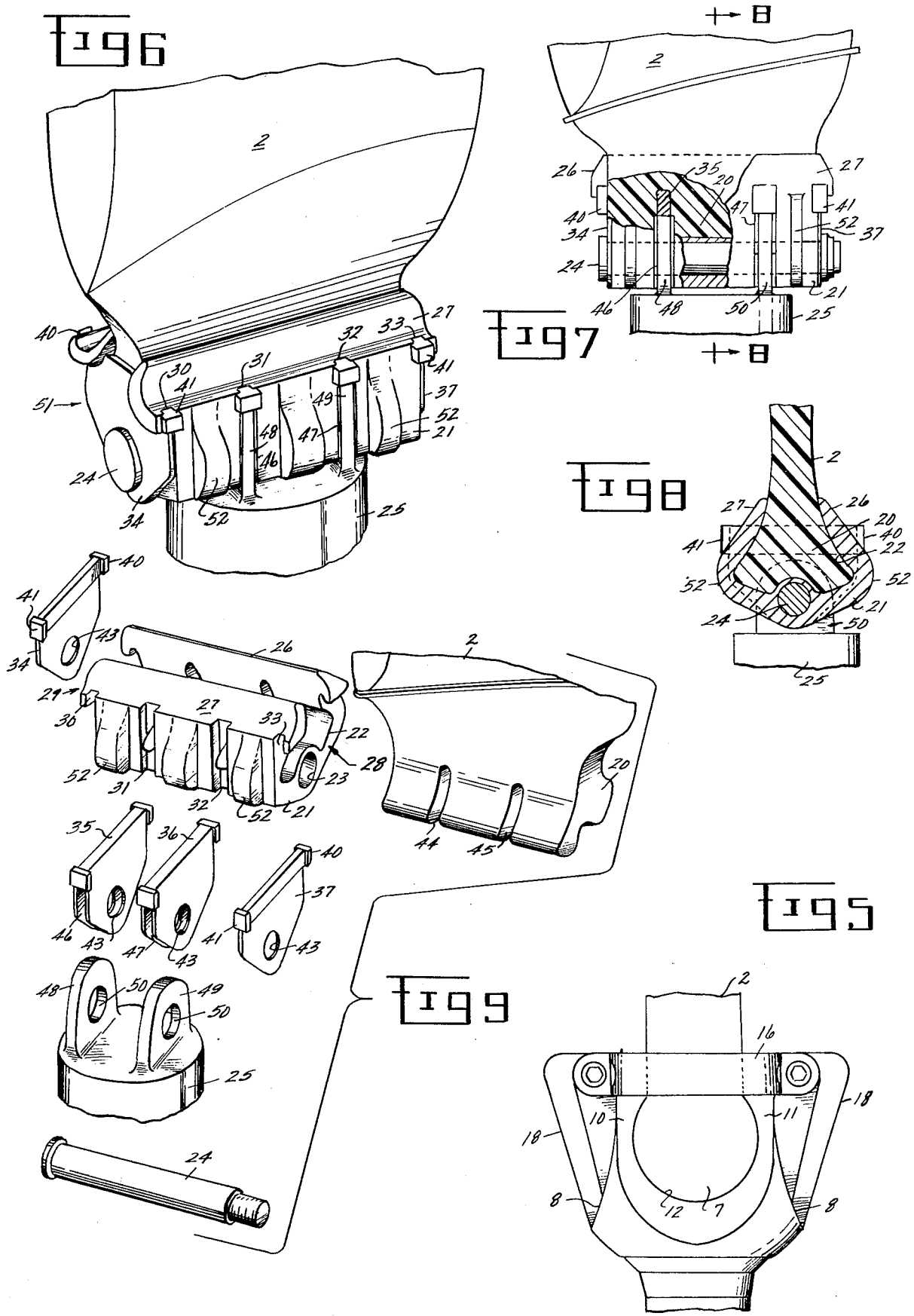

IMPACT ABSORBING BLADE MOUNTS FOR VARIABLE PITCH BLADES

The invention herein described was made in the performance of work under a NASA contract and is subject to the provisions of Section 305 of the National Aeronautics and Space Act of 1958, Public Law 85-568 (72 Stat. 435; 42 USC 2457).

FIELD OF THE INVENTION

This invention relates to a variable pitch blade mount suitable for propellers, fans and the like. More particularly, the invention relates to an improved blade mount for composite fan blades which is capable of absorbing energy from the impact of a large object such as a bird.

BACK GROUND OF THE INVENTION

In the past, turbomachine blades have been of the non-variable pitch type and have usually been retained on a turbine disc by way of a dovetail type attachment which provides for the mounting of the blade in one of many circumferentially spaced dovetail-shaped slots disposed around the edge of the turbine disc. With this arrangement the radial forces caused by centrifugal loading were taken up by the individual slot side portions and the lateral forces thus created were somewhat balanced by the substantially opposite lateral forces from adjacent slots.

With the advent of the variable pitch blade, it was necessary to rotate the blade about its longitudinal axis and it could then no longer be tightly fixed within the turbine disc. One method by which this rotation was accomplished is shown by U.S. Pat. No. 3,487,879 issued to R. F. J. McCarthy et al, which teaches the use of a composite blade having an enlarged root which is secured within the confines of a steel spindle which is in turn rotatably disposed in a compressor rotor drum or hub. It may be seen that because the radial forces caused by centrifugal action on the blades are not balanced by the forces from adjacent dovetail slots the size and weight of the steel spindle assembly is quite significant with respect to the rest of the blade. Increased weight has many disadvantages and thus it is an important object of the present invention to provide a method of mounting variable pitch composite blades with simplicity and significantly reduced weight.

Another problem recognized in the composite blade art is that composites, although very strong for tensile loading and compressive axial loading in the direction of the fibers, have less strength in shear and in the transverse directions. Since loading along the working portion of the blade is basically tensile, root design and root attachment methods have always been a critical part of composite blade development effort. The major weakness found in prior art composite blades and blade mounting arrangements is in the area of impact by large foreign objects such as a bird. For instance tests have shown that upon impact of a large foreign object most composite blade fractures occur at the root adjacent to the dovetail region. It is thus another important object of the invention to improve the impact capability of composite blades while still maintaining the operating strength provided by conventional composite dovetail root and mount design. This is accomplished by permitting the blade to pivot at the root when impacted and allowing centrifugal force to be the primary energy absorbing mechanism.

The prior art has considered mounting metallic blades in a manner which permits such pivoting of the blades, as for example, by the method commonly known as the pin root approach. However, it should be obvious that due to the above-mentioned transverse loading problem peculiar to composite blade technology such a pinning device may be undesirable for a composite blade. It is thus another object of the present invention to provide a blade mount that allows the blade to pivot upon impact with a foreign object and that overcomes the particular problems related to the mounting of a composite blade.

SUMMARY OF THE INVENTION

The aforementioned objects of the invention are carried out in two principal embodiments both of which provide for the pivoting of the blade as a primary impact energy absorbing mechanism. In the first embodiment of keyhole concept, a composite blade having a keyhole-shaped root is slideably received in a blade mounting jaw of keyhole-shaped cross section. Tie bars are provided for preventing the movement of the blade in an axial direction and preventing the expansion of the keyhole-shaped jaw during centrifugal loading. The keyhole-shaped root permits the blade to pivot when impacted making centrifugal force recovery and friction between the blade root and blade mounting member the principal energy-absorbing mechanisms. In a second embodiment or outsert concept, a low-friction pin root attachment is provided by bonding a dovetail-shaped composite blade root to a metal outsert, the outsert having a jaw of dovetail-shaped cross section for receiving the blade root and an axially disposed hole for receiving a pinning member. Both the outsert and blade root are provided with a plurality of slots orthagonal to the axially disposed hole. In one of the outermost slots, solid tie bars having holes for receiving the pinning member therein and shoulders for engaging the outsert sides, are slideably received and bonded to the outsert and blade root. In the remaining one or more slots, slotted tie bars, having holes for receiving the pinning member therein and shoulders for engaging the outsert sides, are slideably received by the outsert and blade root and bonded thereto. Both the solid and slotted tie bars prevent axial movement of the blade and prevent expansion of the dovetail-shaped jaw during centrifugal loading. A variable pitch hub is provided having clevises with holes for receiving the pinning member therein so that the tie bars, outsert and blade root may be pivotably attached thereto.

DESCRIPTION OF THE DRAWINGS

FIG. 5 is an end view of a portion of the structure shown in FIG. 2.

FIG. 6 is a perspective view of a second embodiment of the invention.

FIG. 7 is a side view partially in section of the structure shown in FIG. 6.

FIG. 8 is a vertical section of the structure taken on line 8—8 of FIG. 7.

FIG. 9 is an exploded view of the second embodiment of the invention.

DESCRIPTION OF THE PREFERRED EMBODIMENT

Figure 1:
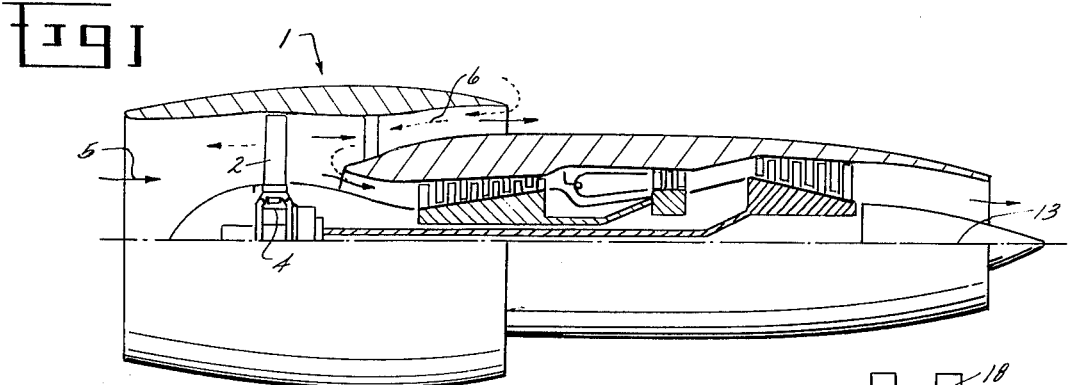
FIG. 1 is a view partially in section of a conventional turbofan engine having variable pitch blades.

Referring to FIG. 1 there is shown a conventional turbofan engine 1 having variable pitch blades 2 and a mechanism 4 for selectively varying the pitch of the blades. The use of variable pitch blades in turbomachines is generally desirable so that the pitch angle of the compressor blades 2 may be changed for various operating conditions. Variable pitch mechanisms are also advantageously used to slow the aircraft by reversing the pitch of the blades and thereby reversing the flow of thrust. FIG. 1 shows the airflow for the forward thrust operation with solid arrows 5 and the airflow resulting from reverse thrust operation with dotted arrows 6.

Figure 2:
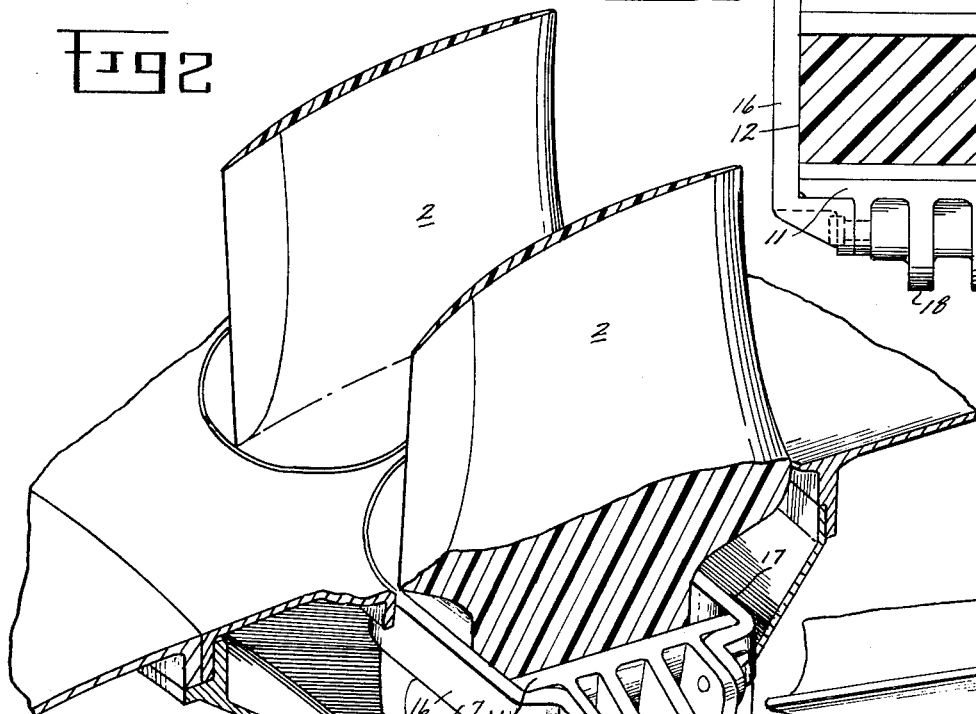
FIG. 2 is a perspective view of a first embodiment of the invention.
Figure 3:
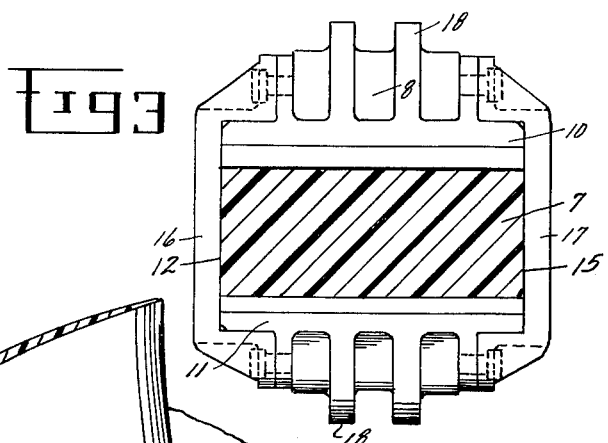
FIG. 3 is a top view of the structure shown in FIG. 2 with the blade root in section.
Figure 4:
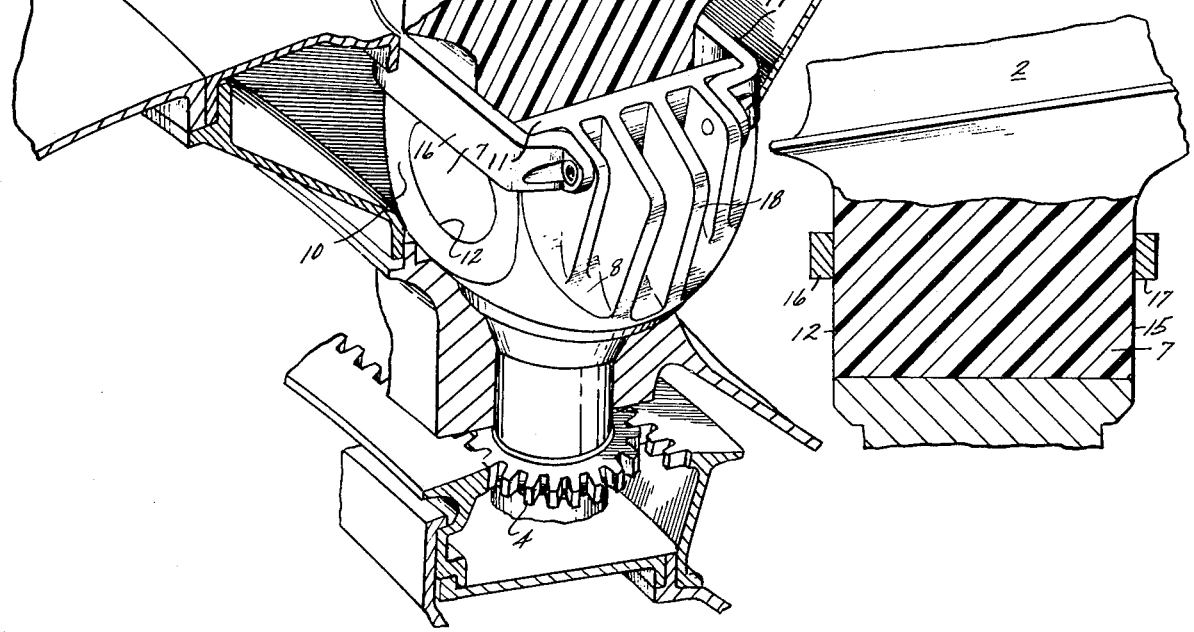
FIG. 4 is a side view partially in section of a portion of the structure shown in FIG. 2.

The first embodiment of the invention or keyhole concept is illustrated in FIGS. 2 through 5. Referring now mainly to FIGS. 2 and 5, a composite blade 2 having a root 7 of keyhole-shaped cross section is slideably received in a metal blade mounting member or jaw 8 which is connected to the variable pitch mechanism 4. The jaw 8 has opposing sides 10 and 11 which define an area of keyhole-shaped cross section for receiving the blade root 7. The opposing sides 10 and 11 of the jaw 8 provide a bearing surface for the pivoting of the blade root 7 in the event that the blade 2 is struck by a large foreign object. By thus providing for the pivoting of the blade 2 relative to the jaw 8 about an axis parallel to the centerline of the engine 13, centrifugal force recovery and frictional losses between the blade root 7 and keyhole-shaped jaw 8 become the primary energy-absorbing mechanisms.

The jaw 8 has two open ends 12 and 15 around which a pair of metal tie bars 16 and 17 are fastened. The tie bars 16 and 17 serve two important functions. First, they prevent movement of the blade root 7 in an axial direction. And secondly, by engaging the opposing jaw sides 10 and 11, they serve to resist lateral forces which tend to expand the jaw 8 during centrifugal loading. Added resistance to lateral jaw opening forces is also provided by fins 18 extending radially outwardly from the opposing sides 10 and 11 of the jaw 8.

It is not necessary that the keyhole concept take the specific embodiment shown here. For example, only one end of the jaw 8 need be open and thus only one tie bar would be required. Also it is not necessary that the tie bars 16 and 17 be fastened to the open ends 12 and 15 of the jaw 8. Some configuration wherein the tie bars slideably engage or clip over the opposing sides of said jaw would be consistent with the objects of the invention. The important function served by the keyhole concept is that the blade 2 may now pivot relative to the jaw 8 about an axis parallel to the centerline of the engine 13 when impacted. In addition to improving impact strength, the ability to pivot at the root prevents any large bending movements from developing at the root and thus improves overall blade life. Testing of the keyhole concept has shown that it provides double the impact capability of conventional blade mounting techniques while maintaining the same operating strength. A significant weight saving over conventional blade mounting techniques is also realized since the jaw 8 and tie bars 16 and 17 do not weigh as much as conventional blade mounts of the same operating strength that completely surround the blade root.

A second embodiment of the invention, or outsert concept, is illustrated in FIGS. 6 through 9. Referring now mainly to FIG. 9, there is shown blade root 20 of dovetail-shaped section engaged and partially surrounded by a metal blade mounting member 21 hereinafter referred to as an outsert. The outsert 21 includes a jaw portion 22 having an axially extending hole 23 formed therein for connecting the outsert 21 and spindle 25 by means of a pin 24. Spindle 25, in turn, is connected to a variable pitch mechanism (FIG. 1). As FIGS. 8 and 9 most clearly illustrate, the jaw 22 has opposing sides 26 and 27 which define an area of dovetail-shaped cross section having two open ends 28 and 29 either of which may be used for receiving the blade root 20. The outsert 21 is also provided with a plurality of slots 30 through 33 orthagonal to the axially extending hole 23. The orthagonal slots 30 through 33 receive a plurality of tie bars 34 through 37. The tie bars each include shoulders 40 and 41 which engage the opposing sides 26 and 27 of the jaw 22 to resist the expansion of the jaw during centrifugal loading. The tie bars also serve to prevent movement of the blade root 20 in an axial direction. The blade root 20, outsert 21 and tie bars 34 through 37 are bonded together during assembly so that the tie bars 34 through 37, which include holes 43 for receiving the pin 24 may directly transmit a portion of the centrifugal load to the pin 24. However, most of the centrifugal load is transmitted through the outsert 21 from the jaw 22 to the pinning member 24. The blade root 20 is also provided with transverse or orthagonal slots 44 and 45 aligned with the inner slots 31 and 32 in the outsert 21 so that the inner tie bars 35 and 36 may extend therethrough. The inner tie bars 35 and 36 are also provided with slots 46 and 47 respectively for engaging a pair of clevises 48 and 49 respectively disposed on the spindle 25. The clevises 48 and 49 include holes 50 through which the pin 24 pivotably engages the blade root outsert and tie bar assembly, indicated generally in FIG. 6 by the numeral 51, to the spindle 25. In addition to the tie bars 34 through 37, added resistance to lateral jaw opening forces is also provided by fins 52 extending outwardly from the opposing sides 26 and 27 of the jaw 22.

It is not necessary that the outsert concept take the specific embodiment shown here to be consistent with the objects of the invention, and it is intended in the appended claims to cover various combinations and modifications of the components described above. The important function served by the outsert concept is the provision of a blade root mounting arrangement wherein a composite blade root 20 with a conventional dovetail design is allowed, upon impact with a foreign object, to pivot about an axis generally parallel to the centerline of the engine (the axis of the jaw may be slightly turned in a variable-pitch apparatus) with less rolling or sliding friction than is provided by the keyhole mounting arrangement. This provides greater freedom to pivot under normal vibratory movement and impact. Tests of blades mounted according to the keyhole concept have shown that they do not always effectively self-center under purely centrifugal load. The friction in the keyhole in some instances will permit slight tilt variations from blade to blade and result in fan unbalance forces. A true pin attachment such as that provided with blades mounted according to the outsert concept permits more precise centrifugal centering of the blades, and avoids this problem. Those skilled in the art will also recognize that the outsert concept will allow the designer to choose desirable pin and blade root frequency characteristics varying by the diameter of the pin. Also, the use of tie bars 35 and 36 extending through the blade root 20 in the outsert concept more effectively resists lateral jaw opening forces than the structure employed in the keyhole concept, resulting in significantly reduced weight for a blade mount having the same operating strength. The lower friction moment required to pivot the outsert arrangement further reduces induced moments within the blade and improves impact resistance of the root as well as portions of the blade in the vicinity of the root. The reduced friction or end moment upon impact also offers some secondary reduction to localized impact damage. However, the outsert concept of mounting the blade results in less energy being absorbed than results from the keyhole rotational friction and would require a further angle of rotation for the same total energy absorption.

Blade roots of dovetail-shaped cross section are well known in the art and in this respect both the keyhole and outsert concepts take advantage of past composite blade development efforts. Both types of blades have been shown to have sufficient strength to meet normal operating stresses; however, use of these blades has been hampered by their low impact strength. Tests of the keyhole-mounting arrangement have demonstrated its ability to double the impact strength of composite blades by allowing centrifugal force recovery to become the principal energy-absorbing means.

It should be noted that it would not be inconsistent with the objects of the invention if the blade root in either of the above embodiments were secured during normal operating conditions by a shear pin, or provided with a resilient self-centering energy absorbing means such as a rubber pad. It should also be noted that the blade mounts herein disclosed are not necessarily limited to use with composite blades. However, as a practical matter, they are unlikely to be used with a metal blade because metal blades, unlike composite blades, may extend radially inwardly all the way for direct attachment to a variable pitch hub.

These and other modifications may be employed by those skilled in the art without departing from the invention, and it is intended by the appended claims to cover these and other modifications.

What is claimed as new and desired to be secured by Letters Patent of the United States is:

1. A blade mount for a variable pitch blade including a blade root, said blade mount comprising:
   a. a jaw having opposing sides defining a cross-sectional shape corresponding to that of the blade root, said jaw being open on at least one end for slideably receiving said blade root, and providing for the pivoting of the blade about an axis for absorbing impact energy, and
   b. a tie bar interconnecting said jaw opposing sides to resist the expansion of said jaw during centrifugal loading.

2. The apparatus of claim 1 wherein the opposing sides of said jaw include a plurality of fins extending outwardly to further resist the expansion of said jaw during centrifugal loading thereof.

3. The apparatus of claim 1 wherein said tie bar extends across said jaw open end to retain said blade root in said jaw.

4. The apparatus of claim 1 wherein said blade root and said jaw are generally of a keyhole shape and further wherein said blade root is pivotable within said jaw to absorb impact energy.

5. The apparatus of claim 1 wherein said jaw includes an outsert for receiving and rigidly retaining said blade root and an axially extending hole for pivotably mounting said outsert to a pin.

6. The apparatus of claim 5 wherein the opposing sides of said jaw define a shape of dovetail cross section.

7. The apparatus of claim 5 wherein:
   a. said outsert has at least one slot substantially orthagonal to said axially extending hole and
   b. said tie bar is disposable within said slot, said tie bar having shoulders on the ends thereof for engaging the respective opposing sides of said jaw, to resist expansion of said jaw during centrifugal loading.

8. The apparatus of claim 7 wherein:
   a. said blade root has at least one slot orthagonal to said axially extending hole and aligned with said blade root slot and
   b. said tie bar is disposed in said blade root slot.

9. The apparatus of claim 8 wherein said outsert and said tie bars are bonded to said blade root.

10. The apparatus of claim 9 whrein said tie bars are further provided with holes aligned with the axially extending hole in said outsert.

11. The apparatus of claim 10 and including a spindle with a clevis having a hole therein for receiving said pin.

12. An improved blade retaining apparatus for connecting a variable pitch blade to a rotatable hub, wherein the improvement comprises:
   a. a shank attached to said hub and extending substantially radially outwardly therefrom;
   b. means for rotating said shank on its longitudinal axis; and
   c. a jaw connected at its one end to the end of said shank and comprising a pair of oppositely disposed arms defining an enlarged slot for receiving a blade root and retaining it from movement in the radially outward direction.

13. The improved blade retaining apparatus of claim 12 and including at least one tie bar interconnecting said arms to resist expansion of said jaw during centrifugal loading thereof.

14. The improved blade retaining apparatus of claim 12 wherein said enlarged slot is substantially formed in a keyhole shape.

15. The improved blade retaining apparatus of claim 13 wherein said at least one tie bar extends across one end of the blade root.

16. The improved blade retaining apparatus of claim 12 wherein said slot is substantially formed in a dovetail shape.

17. The improved blade retaining apparatus of claim 12 wherein said jaw includes a base portion adapted to be connected to said shank so as to be pivotable about an axis.

18. The improved blade retaining apparatus of claim 17 wherein said base portion has a hole formed therein for receiving a pin which pivotally connects said base to said shank.

19. The improved blade retaining apparatus of claim 13 wherein said blade root has at least one transverse slot formed therein and further wherein said tie bar is disposed in said transverse slot.

20. The improved blade retaining apparatus of claim 19 wherein said jaw has formed therein at least one transverse slot for alignment with said blade root transverse slot and for receiving said tie bar therein.

21. The improved blade retaining apparatus of claim 13 wherein said tie bar includes at each end a shoulder for engagement with its associated jaw arm.

* * * * *